United States Patent
Haugen et al.

(10) Patent No.: US 8,016,193 B2
(45) Date of Patent: Sep. 13, 2011

(54) TRANSACTION PRODUCT WITH STORAGE CHAMBER

(75) Inventors: Patricia L. Haugen, Minnetonka, MN (US); Adam W. Reynolds, Minneapolis, MN (US); Ted C. Halbur, Lino Lakes, MN (US); Erin M. Borkowski, Andover, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 637 days.

(21) Appl. No.: 11/965,467

(22) Filed: Dec. 27, 2007

(65) Prior Publication Data
US 2009/0166436 A1 Jul. 2, 2009

(51) Int. Cl.
*G06K 5/00* (2006.01)
(52) U.S. Cl. .......................... 235/380; 235/375; 235/487
(58) Field of Classification Search .................. 235/379, 235/380
See application file for complete search history.

(56) References Cited

U.S. PATENT DOCUMENTS

| | | | |
|---|---|---|---|
| 1,116,043 A | 11/1914 | Elliott | |
| 1,508,733 A | 9/1924 | Trabold | |
| 2,002,166 A * | 5/1935 | Bandes et al. | 273/148 A |
| 2,083,356 A * | 6/1937 | Batdorf | 220/351 |
| D164,862 S | 10/1951 | Johnson | |
| D165,219 S | 11/1951 | Degner | |
| 3,140,777 A | 7/1964 | Gordan | |
| 3,434,414 A | 3/1969 | Wright | |
| 3,802,101 A | 4/1974 | Scantlin | |
| 4,326,123 A | 4/1982 | Hosterman | |
| 4,620,664 A | 11/1986 | Kaufman et al. | |
| 4,747,620 A | 5/1988 | Kay et al. | |
| 4,872,555 A | 10/1989 | Shadrach, III et al. | |
| 4,897,533 A | 1/1990 | Lyszczarz | |
| 4,946,057 A | 8/1990 | Connolly et al. | |

(Continued)

FOREIGN PATENT DOCUMENTS
DE 2737164 2/1979
(Continued)

OTHER PUBLICATIONS www.kardwell.com/minicards via www.archives.org, Dec. 20, 2006, all.*

(Continued)

*Primary Examiner* — Thien M. Le
*Assistant Examiner* — Christopher Stanford
(74) *Attorney, Agent, or Firm* — Griffiths & Seaton PLLC

(57) ABSTRACT

A transaction product includes a housing and an account identifier. The housing includes a first member, which defines a primary panel and a side wall extending around the primary panel to define a storage chamber, and a second member slidably coupled with the first member. The second member is configured to slide relative to the first member between an open position and a closed position. In the closed position, the second member covers the storage chamber, and in the open position, the storage chamber is readily accessible. The second member slides relative to the first member between the open position and the closed position in a direction substantially perpendicular to an extension of the side wall from the primary panel of the first member. The account identifier links the housing to an account or record and is machine readable. Other cards, products, assemblies and associated methods are also disclosed.

29 Claims, 11 Drawing Sheets

U.S. PATENT DOCUMENTS

| | | | |
|---|---|---|---|
| 5,215,792 | A | 6/1993 | Miller |
| 5,246,161 | A | 9/1993 | Kapp |
| 5,270,101 | A | 12/1993 | Helicher |
| 5,310,061 | A | 5/1994 | Kanbar |
| D351,104 | S | 10/1994 | Kapp |
| 5,363,964 | A | 11/1994 | Hexter, Jr. |
| 5,538,135 | A | 7/1996 | Hexter, Jr. |
| 5,577,609 | A | 11/1996 | Hexter, Jr. |
| 5,626,937 | A | 5/1997 | Morikawa et al. |
| 5,667,876 | A | 9/1997 | Radlicz |
| 5,803,497 | A | 9/1998 | Suess |
| 5,834,127 | A | 11/1998 | Baerenwald et al. |
| 6,006,456 | A | 12/1999 | Hiromachi et al. |
| 6,025,283 | A | 2/2000 | Roberts |
| 6,237,843 | B1 | 5/2001 | Falat et al. |
| 6,644,551 | B2 | 11/2003 | Clayman et al. |
| 7,163,152 | B2 | 1/2007 | Osborn et al. |
| D536,246 | S | 2/2007 | Schneider |
| 7,264,155 | B2 | 9/2007 | Halbur et al. |
| 7,398,917 | B2 | 7/2008 | Aibazov et al. |
| 7,445,157 | B2 | 11/2008 | Clegg et al. |
| 2002/0088855 | A1* | 7/2002 | Hodes ............................ 235/385 |
| 2002/0143697 | A1 | 10/2002 | Gotfried |
| 2004/0126284 | A1* | 7/2004 | Lilly et al. ..................... 422/119 |
| 2006/0102729 | A1 | 5/2006 | Gandel et al. |
| 2006/0124749 | A1 | 6/2006 | Osborn et al. |
| 2006/0208062 | A1 | 9/2006 | Osborn et al. |
| 2006/0261170 | A1* | 11/2006 | Mooney et al. ................ 235/486 |
| 2007/0017999 | A1 | 1/2007 | Liu |
| 2007/0194128 | A1* | 8/2007 | Coe et al. ...................... 235/486 |
| 2007/0215694 | A1 | 9/2007 | Clegg |
| 2007/0241186 | A1 | 10/2007 | Lindahl et al. |
| 2007/0241197 | A1 | 10/2007 | Lindahl et al. |
| 2007/0241198 | A1 | 10/2007 | Halbur et al. |
| 2008/0067254 | A1 | 3/2008 | Lee |

FOREIGN PATENT DOCUMENTS

| | | |
|---|---|---|
| DE | 3247964 | 7/1984 |
| GB | 2223983 | 4/1990 |
| GB | 2277482 | 11/1994 |
| JP | 8011962 | 1/1996 |
| JP | 10076799 | 3/1998 |
| JP | 2000225799 | 8/2000 |
| JP | 2002298039 | 10/2002 |

OTHER PUBLICATIONS

Photograph of a Tin Holder for Containing a Gift Card. Available for Sale in Wal-Mart Stores more than one year prior to Dec. 27, 2007, (1 page).

"Stored-Value Card With Chemical Luminescence," U.S. Appl. No. 11/510,264, filed Aug. 25, 2006.

"Stored-Value Product With Housed Article," U.S. Appl. No. 11/697,271, filed Apr. 5, 2007.

"Transaction Product With Removable Articles," U.S. Appl. No. 11/843,844, filed Aug. 23, 2007.

"Transaction Product With Gelatinous Substance," U.S. Appl. No. 11/843,855, filed Aug. 23, 2007.

"Transaction Product With Movable Member," U.S. Appl. No. 11/932,044, filed Oct. 31, 2007.

* cited by examiner

TRANSACTION PRODUCT WITH STORAGE CHAMBER

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product including a housing and an account identifier. The housing includes a first member and a second member. The first member defines a primary panel and a side wall extending around the primary panel to define a storage chamber. The second member is slidably coupled with the first member and is configured to slide relative to the first member between an open position and a closed position. In the closed position, the second member covers the storage chamber, and in the open position, the storage chamber is readily accessible. The second member slides relative to the first member in a direction substantially perpendicular to an extension of the side wall from the primary panel of the first member. The account identifier links the housing to an account or a record and is machine readable. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
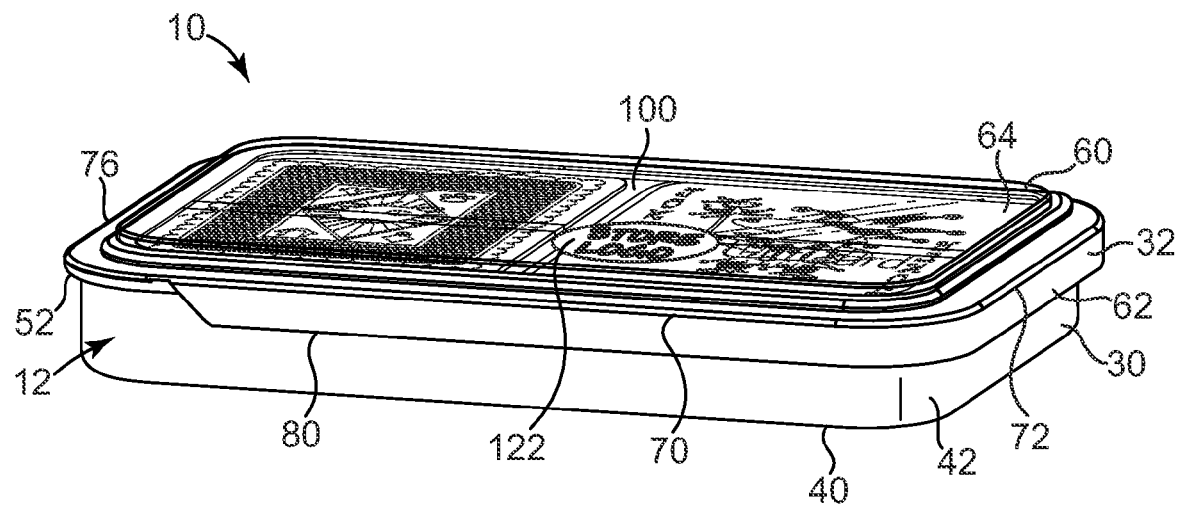
FIG. 1 is a perspective view illustration of a transaction product, according to one embodiment of the present invention.
Figure 2:
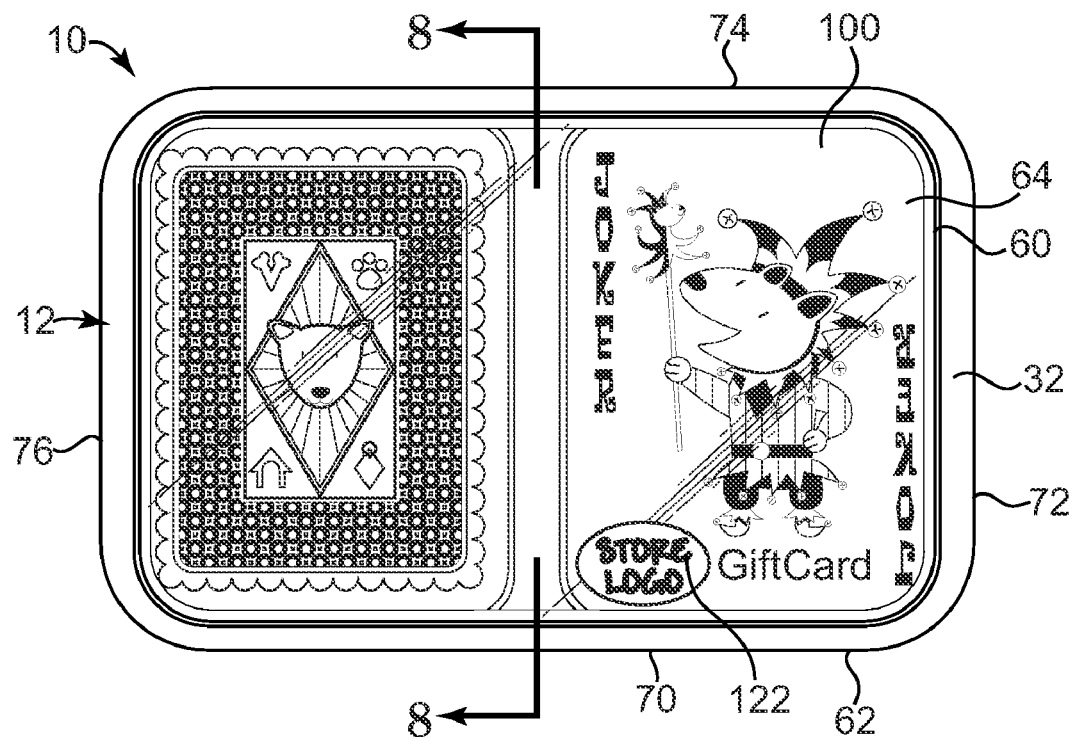
FIG. 2 is a top view illustration of the transaction product of FIG. 1, according to one embodiment of the present invention.

The following detailed description merely provides examples of the invention and is not intended to limit the invention or the application and uses of the invention. Furthermore, there is no intention to be bound by any theory presented in the preceding background of the invention or the following detailed description of the invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with a reusable housing and/or with functional articles removably maintained therein.

More specifically, in one example, the transaction product includes a housing configured to selectively open and close to allow access to a storage chamber maintained therein. The housing includes a cover and a base that, in one embodiment, are slidably or hingedly coupled to one another to allow for repeated opening and closing thereof. In one embodiment, functional articles are maintained within the housing. For instance, a pack of miniature playing cards are included in the housing of the transaction product. In view of the above, transaction products according to embodiments described above provide bearers of the transaction products with non-transactional functionality such as a storage compartment and additional objects maintained therein. This non-transaction functionality of the transaction product generally promotes purchase and reloading of the transaction product.

Turning to the figures, FIGS. 1-6 illustrate one embodiment of a transaction product 10 such as a stored-value product (e.g., gift card, phone card, etc.), credit product, transaction card, etc. according to the present invention. Transaction product 10 is configured to be used toward the purchase and/or use of goods and/or services and includes a casing or housing 12 and one or more articles 14 stored therein and configured to be repeatedly stored in and removed from housing 12.

Transaction product 10, for example housing 12, includes an account identifier 20 (FIG. 3) such as a bar code, magnetic strip, a smart chip or other electronic device, a radio frequency identification (RFID) device or other suitable identifier readily machine readable by a point-of-sale terminal or other account access station or kiosk. Account identifier 20 indicates an account or record to which transaction product 10 is linked. The account or record of the monetary or other balance on transaction product 10 optionally is maintained on a database, other electronic or manual record-keeping system or, in the case of "smart" cards for example, on a chip or other electronic devices on transaction product 10 itself. Accordingly, by scanning account identifier 20, the account or record linked to transaction product 10 is identified and can subsequently be activated, have amounts debited therefrom and/or have amounts added thereto.

In one embodiment, account identifier 20 includes a character string or code 22 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 20 is one example of means for linking transaction product 10 with an account or record, and scanning of account identifier 20 is one example of means for activating or loading value on transaction product 10.

In one embodiment, housing 12 includes a first housing member 30 and a second housing member 32. In one embodiment, first housing member 30 is a base, and second housing member 32 is a cover. In one example, base 30 and cover 32 are movably or selectively coupled with one another such that the one or more articles 14 stored therein can be selectively accessed for removal from housing 12 or placement back into housing 12. In one example, base 30 and cover 32 are slidably coupled with one another such that cover 32 can be repeatedly slid onto base 30 to couple cover 32 to base 30 and slid at least partially off of base 30 to allow access to the one or more articles 14 stored therein.

In one embodiment, base 30, as described with reference to FIGS. 3 and 6, generally includes a primary panel 40 and a side wall 42. Primary panel 40 is generally planar and defines an outside surface 44 (FIG. 3) and an inside surface 46 (FIG. 6) opposite outside surface 44. In one embodiment, primary panel 40 is generally rectangular and sized similarly to an identification card or a credit card. In other embodiments, primary panel 40 is otherwise shaped as a square, circle, oval, star or any other suitable shape.

Side wall 42 extends from inside surface 46 away from outside surface 44 and, in one example, substantially about an entire outer perimeter of primary panel 40 to define a compartment or storage chamber 48 (FIGS. 6 and 8) therebetween. In one embodiment, side wall 42 extends with a generally perpendicular orientation relative to primary panel 40. In one embodiment, side wall 42 is curved or chamfered around each corner, if any, defined by side wall 42. Side wall 42 extends from primary panel 40 to define an inside edge 50 opposite primary panel 40. In one example, inside edge 50 is formed as a rolled edge or otherwise defines a lip or flange 52 extending radially outward from the remainder of side wall 42. In one embodiment, flange 52 extends about an entire outer perimeter of side wall 42, and in another embodiment, flange 52 only extends from two parallel sides of side wall 42 as will be apparent to those of skill in the art upon reading the present application.

In one embodiment, base 30 is formed of any suitable material such as a metallic material (e.g., tin, steel or aluminum), an injection molded plastic material (e.g., polycarbonate, polystyrene, polyvinyl chloride (PVC), acrylonitrile butadiene styrene (ABS), polyethylene terephthalate (PET), teslin, polyactide (PLA) or acrylic) or any other suitable material to define the various attributes of base 30. In one embodiment, account identifier 20 is printed or is otherwise applied to outside surface 44 of base 30 as illustrated with reference to FIG. 3.

One embodiment of cover 32 is illustrated with reference to FIGS. 1, 6 and 7. Cover 32 generally includes a primary panel 60 and a side wall 62. Primary panel 60 is substantially planar and defines an outside surface 64 (FIGS. 1 and 6) and an inside surface 66 (FIGS. 7 and 8) opposite outside surface 64. In one embodiment, where primary panel 60 is substantially rectangular, side wall 62 generally includes a first side or segment 70, a second side or segment 72, a third side or segment 74 and a fourth side or segment 76. First segment 70 and third segment 74 are substantially linear and extend parallel to one another. Second segment 72 and fourth segment 76 each extend between first segment 70 and third segment 74 opposite one another. In one embodiment, second segment 72 and fourth segment 76 are substantially linear, curvilinear or otherwise suitably shaped.

Side wall 62 extends from inside surface 66 about at least a portion of an outer perimeter of primary panel 60. In one embodiment, side wall 62 extends from primary panel 60 with a substantially perpendicular orientation and is curved or chamfered around each corner, if any, defined by side wall 62. In one example, side wall 62 extends from at least a portion of each of first segment 70 and third segment 74 of primary panel 60, and in one embodiment, also extends from second segment 72. In one example, side wall 62 does not extend from fourth segment 76 such that fourth segment 76 may be considered an open segment.

In one embodiment, side wall 62 extends with a generally perpendicular orientation relative to primary panel 60 to define an edge 80 opposite primary panel 60. Edge 80 is a rolled edge or otherwise defines a flange or lip 82 extending radially inward from a remainder of side wall 62. As such, a groove 84 (FIGS. 6 and 8) is defined between primary panel 60 and lip 82, in one embodiment groove 84 has a height (i.e., a distance between primary panel 60 and lip 82) that is sized to receive flange 52 of base 30 as will be further described below.

In one embodiment, cover 32 is formed of any suitable material or composite of materials such as a metallic material (e.g., tin, steel or aluminum), an injection molded plastic material (e.g., polycarbonate, polystyrene, polyvinyl chloride (PVC), acrylonitrile butadiene styrene (ABS), polyethylene terephthalate (PET), teslin, polyactide (PLA) and acrylic) or any other suitable material to define the various attributes of cover 32.

Figure 6:
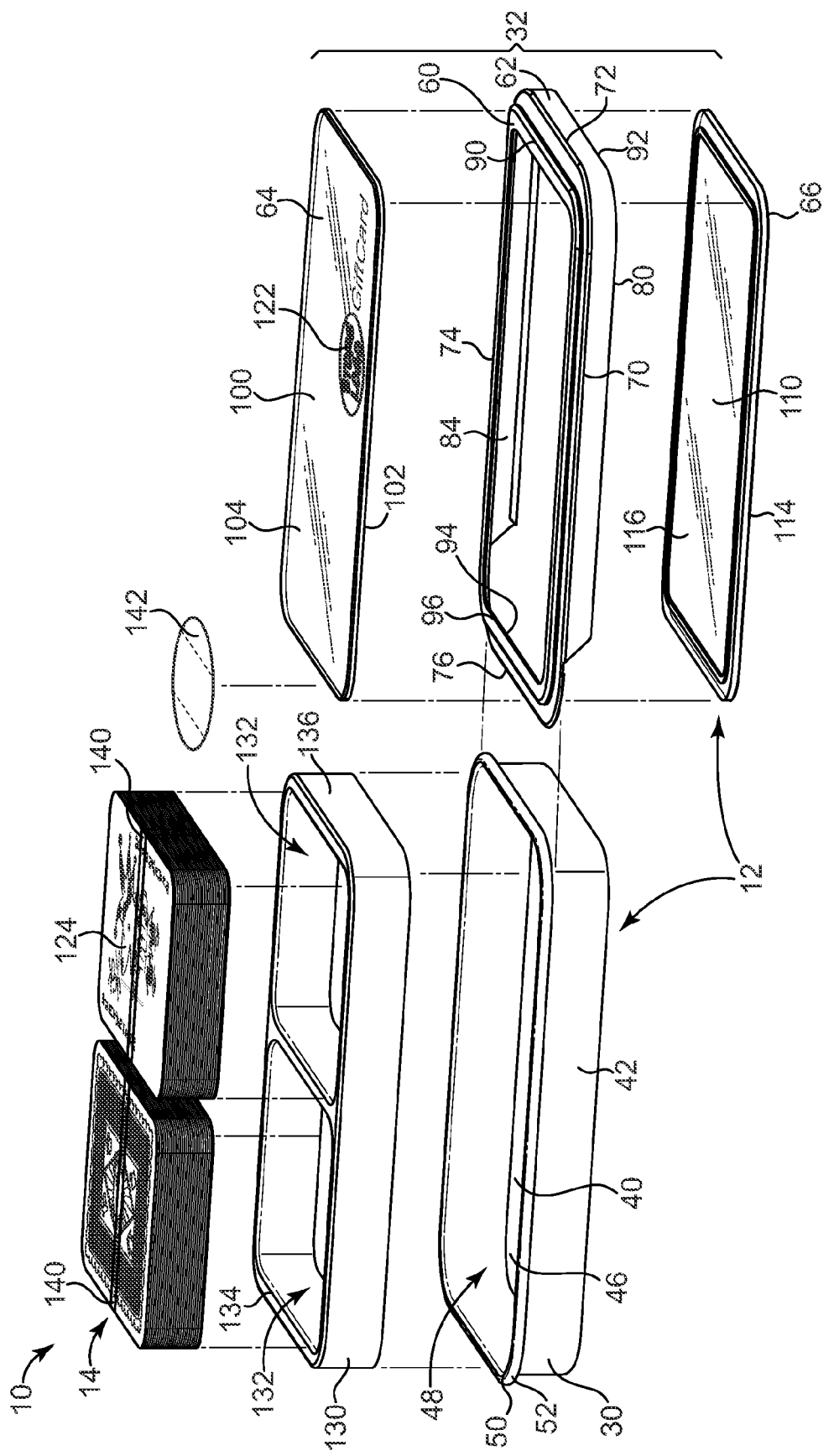
FIG. 6 is an exploded, perspective view illustration of the transaction product of FIG. 1, according to one embodiment of the present invention.
Figure 7:
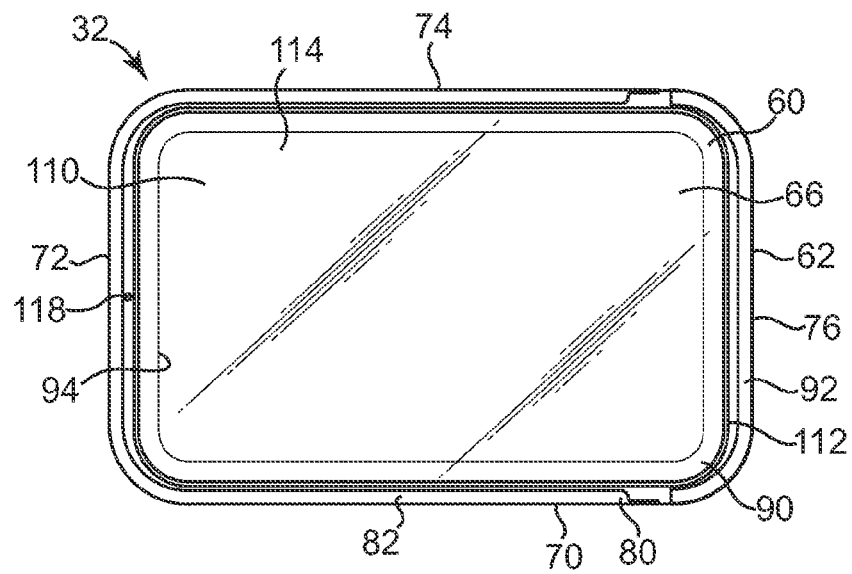
FIG. 7 is a bottom view illustration of a cover of the transaction product of FIG. 1, according to one embodiment of the present invention.
Figure 8:
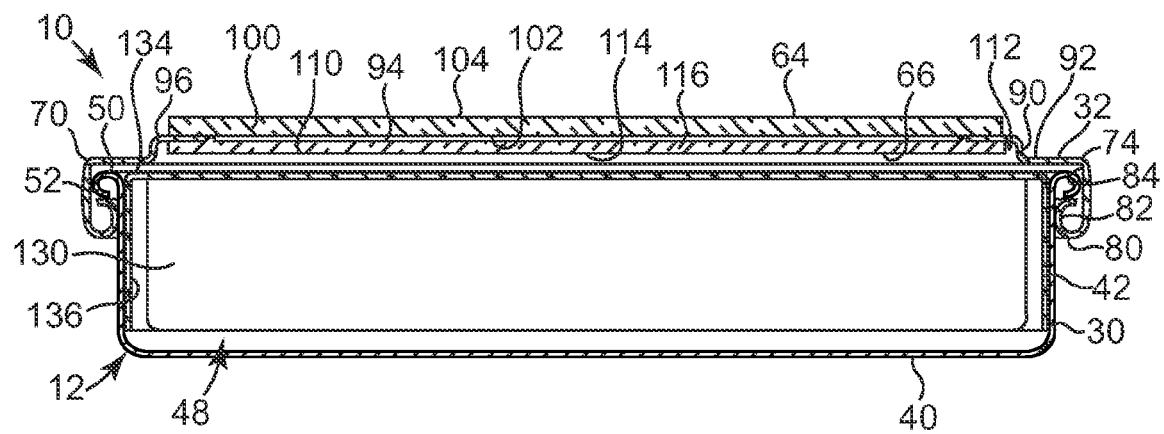
FIG. 8 is a cross-sectional view illustration of the transaction product of FIG. 2 taken along the line 8-8, according to one embodiment of the present invention.

Referring to FIGS. 6-8, in one embodiment, cover 32 is formed of a plurality of pieces such that cover 32 is formed as a composite (i.e., is formed of two or more materials). For example, an outer perimeter or frame 90 of primary panel 60 and side wall 62 are formed as a single member frame piece 92 (e.g., a first piece) of cover 32. Frame piece 92 defines an opening or aperture 94 extending through a middle portion thereof. Frame piece 92 defines a substantially planar ledge 96 immediately adjacent and surrounding aperture 94.

In one embodiment, an external piece 100 (e.g., a second piece) of cover 32 is substantially planar and is sized to cover aperture 94 and to extend across at least a portion of ledge 96. More specifically, an inside surface 102 of external piece 100 is adhered or otherwise coupled or secured to ledge 96 such that at least a portion of primary panel 60 is defined by external piece 100. In one embodiment, external piece 100 is formed of a transparent or translucent material such that a bearer of transaction product 10 can see through at least a portion of primary panel 60.

In one example, in addition or as an alternative to external piece 100, cover 32 additionally includes an internal piece 110 that is substantially planar and is sized to cover aperture 94. More specifically, internal piece 110 is configured to be coupled with an inside surface of frame piece 92 to extend across aperture 94. In one embodiment, frame piece 92 includes an indenture (e.g., FIG. 8) sized to receive internal piece 110. Internal piece 110 defines an inside surface 114 and an outside surface 116 opposite inside surface 114 where outside surface 116 is coupled within an inside of frame piece 92. Internal piece 110 may include one or more flange, protrusion, etc. configured to facilitate positioning of internal piece 110 relative to frame piece 92 as will be apparent to one of skill in the art upon reading the present application. In one example, internal piece 110 is one of transparent and translucent such that a bearer of transaction product 10 can see through at least a portion of primary panel 60. In one embodiment, including both external piece 100 and internal piece 110, ledge 96 of frame piece 92 is interposed between external piece 100 and internal piece 110. In one embodiment, one or more of external piece 100 and internal piece 110 define a window allowing a bearer to see through at least a portion of housing 12.

In one example, a protrusion 118 extends from an inside of frame piece 92 near but radially spaced inwardly from third segment 74 of side wall 62 (e.g., opposite open segment 76). Protrusion 118 is configured to maintain cover 32 in place relative to base 30 when housing 12 is closed as will be further described below.

Figure 3:
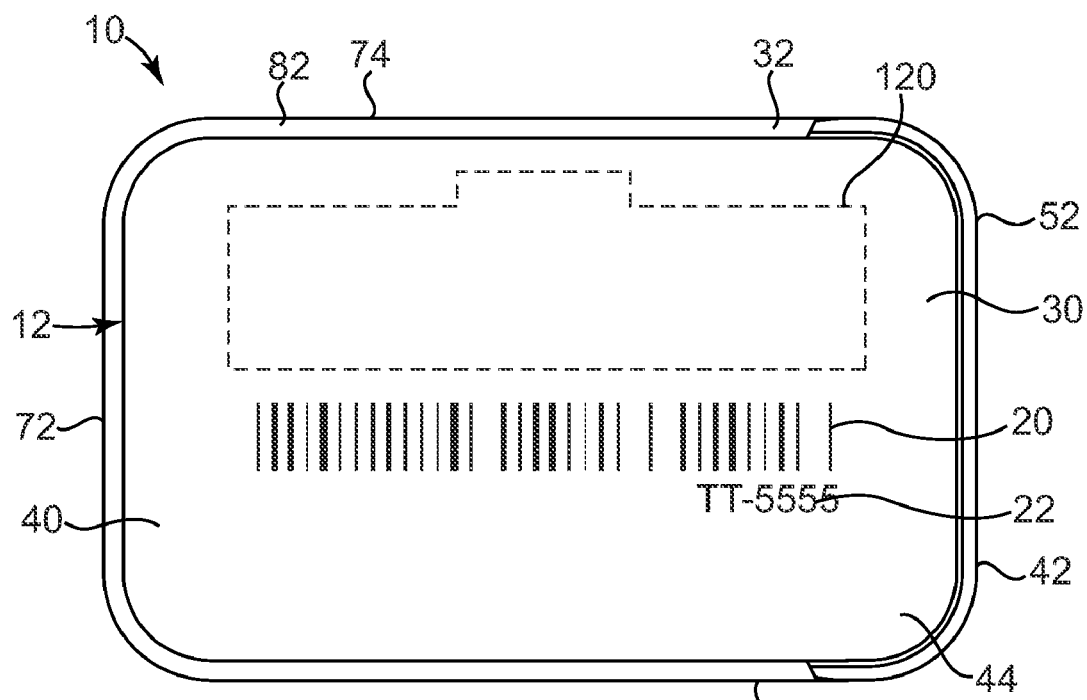
FIG. 3 is a bottom view illustration of the transaction product of FIG. 1, according to one embodiment of the present invention.
Figure 4:
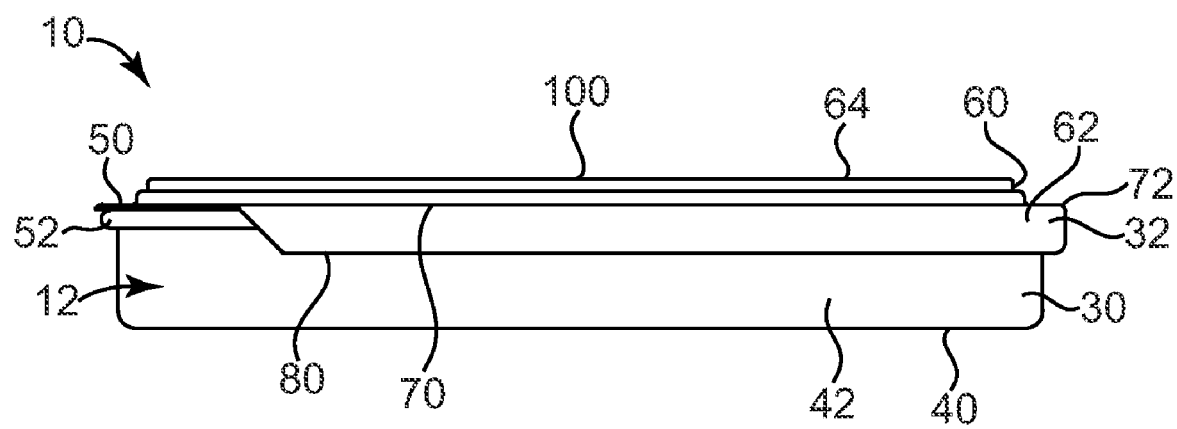
FIG. 4 is a front view illustration of the transaction product of FIG. 1, according to one embodiment of the present invention, wherein the rear view is a mirror image thereof.
Figure 5:
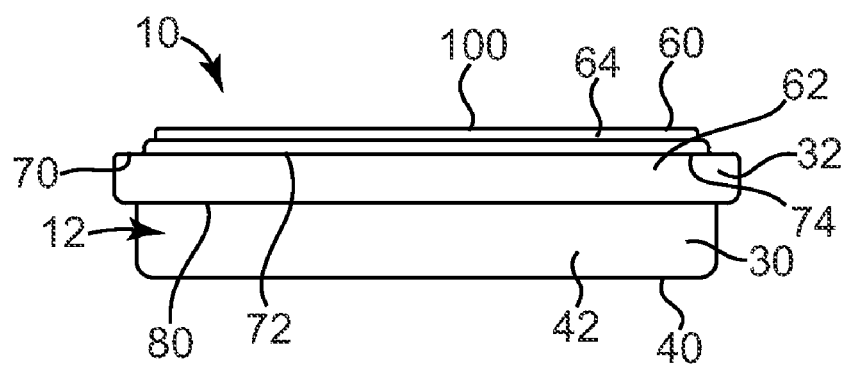
FIG. 5 is a right side view illustration of the transaction product of FIG. 1, according to one embodiment of the present invention, wherein the left side view is a mirror image thereof.

In one embodiment, redemption indicia 120, which are generally indicated with a dashed line box in FIG. 3, are included on transaction product 10, for example, on one or both of outside surface 44 of base 30 and outside surface 64 of cover 32. Redemption indicia 120 indicate that transaction product 10 is redeemable for the purchase of goods and/or services and that, upon use, a value of the purchased goods and/or services will be deducted from the financial account or record linked to transaction product 10. In one embodiment, redemption indicia 120 include phrases such as "<NAME OF STORE> GiftCard" and "This GiftCard is redeemable for merchandise or services at any of our stores or at our web site," and/or provides help or phone line information in case of a lost, stolen or damaged transaction product, etc. In one embodiment, redemption indicia 120 and one or more of any other indicia or information on transaction product 10 are printed on outside surface 44 or outside surface 64 of housing 12.

In one embodiment, brand indicia 122, which identify a brand associated with transaction product 10 such as identifying a product brand, a store brand, department, etc. are also included on one or both of outside surface 44 of base 30 and outside surface 64 of cover 32. Any other suitable indicia may be included on housing 12 as will be apparent to those of skill in the art upon reading this application.

Referring to FIG. 6, one or more articles 14 may be any suitable article(s) 14 configured to be selectively stored within housing 12. In one embodiment, one or more articles 14 include a miniature deck of playing cards. In one example, one or more of the playing cards included in the deck of playing cards include a character (e.g., a brand or store mascot) or other brand indicia 124 (FIG. 6) relating to a product brand, a store brand, department, etc. such that the deck of playing cards alone functions as an advertisement for the product, store and/or department. In one embodiment, brand indicia 124 relate to the retail chain or setting configured to redeem transaction product 10 as payment toward the purchase or use of goods and/or services. As such, brand indicia 124 are one example of means for advertising a retailer adapted to accept transaction product 10 as payment toward the purchase or use of goods and/or services that is included on the one or more articles 14.

In one embodiment, transaction product 10 additionally includes a tray 130 configured to maintain the one or more articles 14 in a neat and orderly fashion within housing 12. As such, in one example, tray 130 is formed with external dimensions allowing tray 130 to be readily slid into and out of housing 12, for example, at least partially into and out of base 30, more specifically, storage chamber 48. In one embodiment, where housing 12 is substantially rectangular, tray 130 is substantially rectangular and interacts with side wall 42 to snugly position tray 130 within storage chamber 48. Tray 130 is configured to receive each of the one or more articles 14 in a generally neat and aesthetically pleasing manner to organize placement of article(s) 14 within storage chamber 48. In one embodiment, tray 130 is independently configured to support the one or more articles 14 whether or not tray 130 is positioned within or outside of housing 12.

Tray 130 may be formed in any suitable manner depending upon the size and shape of the one or more articles 14. In one example, for instance where the one or more articles 14 includes a deck of playing cards, tray 130 defines cavities 132 for receiving a portion of the one or more articles 14. For example, two similarly sized cavities 132 are defined to extend downwardly from a top surface 134 of tray 130, and each cavity 132 is sized to receive a stack of about half of the deck of playing cards. In one example, top surface 134 is shaped similarly to, but slightly smaller than primary panel 40 such that tray 130 fits within storage chamber 48. To add additional rigidity and/or aesthetic appeal to tray 130, in one example, a side wall 136 extends from an outer perimeter of top surface 134 in a direction similar to the extension of cavities 132 from top surface 134.

Although primarily described as being removable from storage chamber 48, in one embodiment, tray 130 is securely and substantially permanently coupled with base 30 to remain in storage chamber 48. In one embodiment, tray 130 is vacuum formed or injection molded using a polymeric material and is coated in flocking to add to the aesthetic appeal thereof. However, tray 130 may be formed of any suitable material. In view of at least the above, tray 130 is one example of means for selectively receiving article(s) 14 and is one example of means for organizing the one or more articles 14 within housing 12, or more specifically, within base 30.

Referring to FIG. 6, during assembly, wherein the one or more articles 14 includes the deck of playing cards, the deck of playing cards is arranged into two stacks, which in one embodiment, are each secured with a rubber band 140 or other suitable wrapper, such as a rubber band 140 and/or other suitable wrapper that is one of transparent or translucent. Each stack of playing cards is then placed within cavity 132 of tray 130. Tray 130 and the one or more articles 14 are placed within storage chamber 48 of housing 12, more particularly, of base 30.

Subsequently, cover 32 is selectively coupled with base 30. For example, additionally referring to the cross-sectional view of FIG. 8, cover 32 is slid onto base 30 to effectively cover base 30 thereby enclosing the one or more articles 14 and/or tray 130 therebetween. In particular, open segment 76 of cover 32 is positioned adjacent to an end of base 30. Cover 32 is slid onto base 30, for example, in a direction from right to left in FIG. 6. More specifically, cover 32 is slid to interact with base 30 such that rolled edge or flange 52 of base 30 is received within groove 84 of cover 32 defined between lip 82 and primary panel 60 of cover 32.

Cover 32 continues to be slid onto base 30 until portion of lip 82 of cover 32 contacts a portion of side wall 62 that corresponds with second segment 72 of primary panel 60. Upon coupling, side wall 62 of cover 32 extends around a portion of, but does not extend over an entire height of side wall 42 of base 30. In one embodiment, protrusion 118 is sized and positioned such that additional force is applied to cover 32 to move protrusion 118 past flange 52 of base 30 in a manner selectively holding cover 32 in a closed position relative to base 30 until a sufficient counter force is applied to cover 32. In view of the above, housing 12 or just base 30 are examples of means for removably containing the one or more articles 14.

In one embodiment, a sticker or label 142 is applied to primary panel 60 adjacent and around fourth segment 76, to side wall 62 and to side wall 42 and/or outside surface 44 of primary panel 40 of base 30 to more securely maintain cover 32 coupled with base 30 especially during periods of transportation or while transaction product 10 is displayed by a retailer in a retail setting. Other variations in the above described transaction product 10 will be apparent to those of skill in the art upon reading this application. Upon final assembly, transaction product 10 functions to both amuse the current bearer of transaction product 10 and to entice potential consumers to purchase transaction product 10. Accordingly, the customer and/or recipient are presented with both a transaction product and a source of additional visible amusement.

Figure 9:
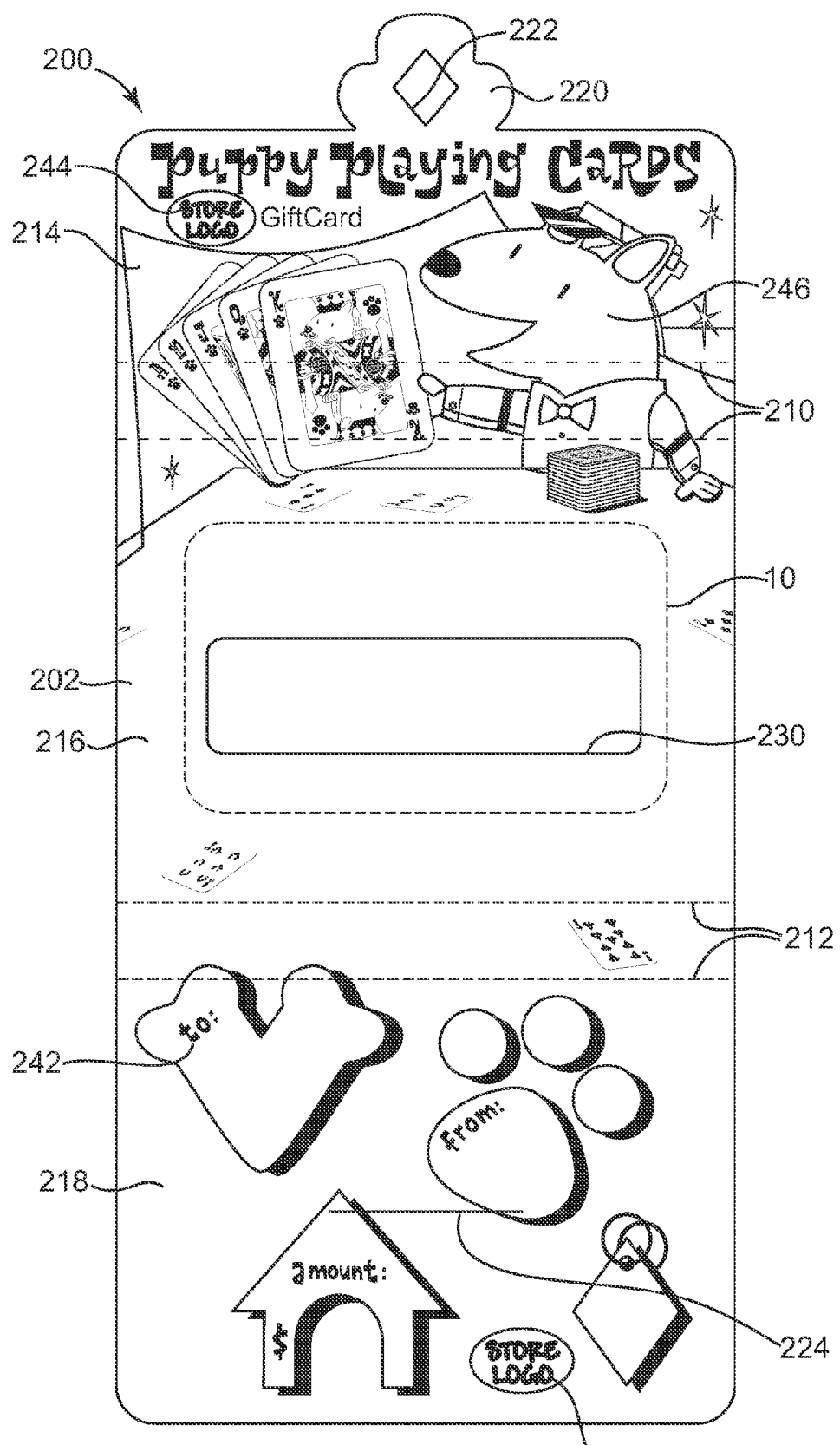
FIG. 9 is a top view illustration of a backer for a transaction product, according to one embodiment of the present invention.
Figure 10:
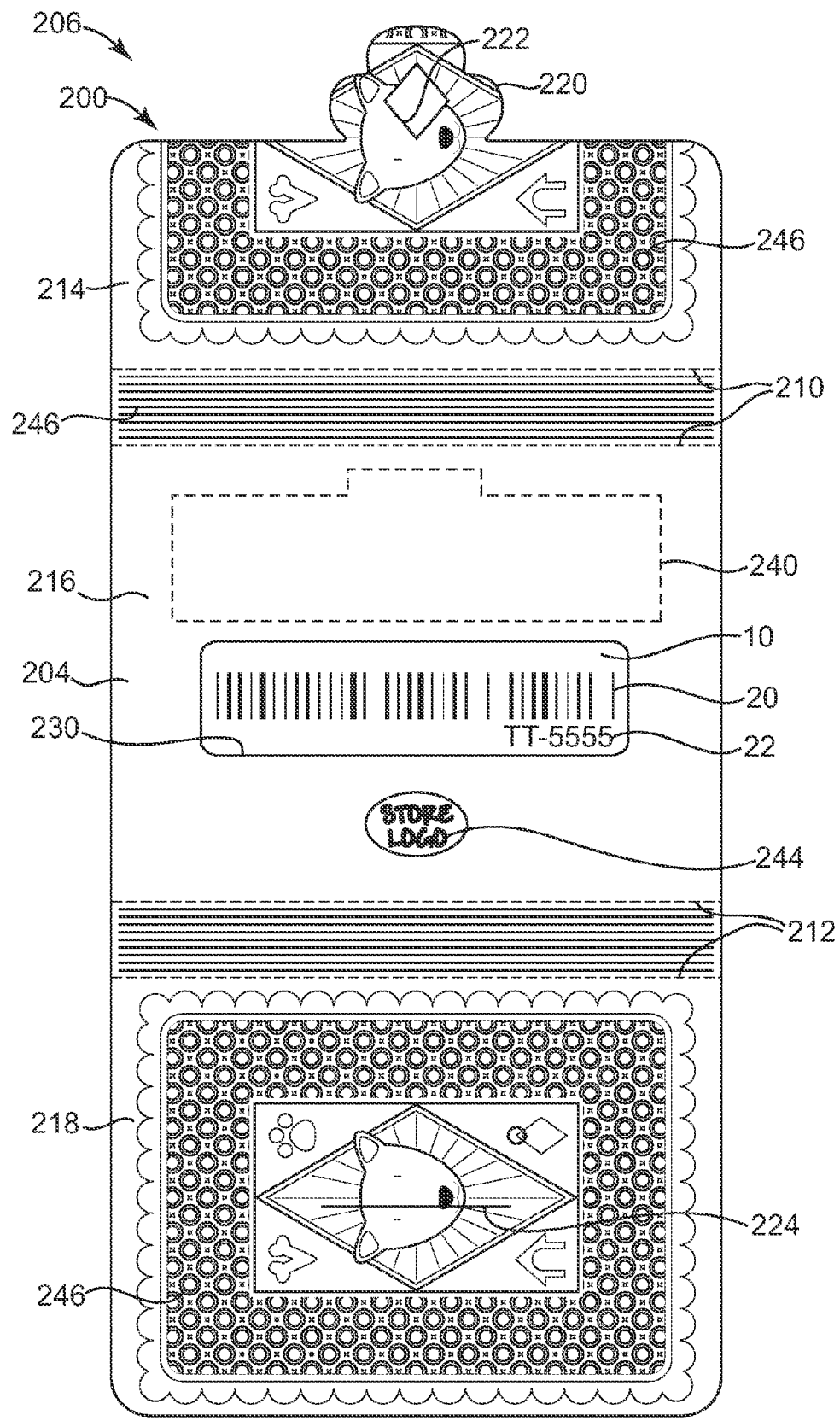
FIG. 10 is a bottom view illustration of a transaction product assembly including the backer of FIG. 9 with the transaction product of FIG. 1, according to one embodiment of the present invention.

FIGS. 9 and 10 illustrate a carrier or backer 200 supporting transaction product 10 (e.g., FIGS. 1-6). Backer 200 comprises a single layer or multiple layers of paper or plastic material, for example, generally in the form of a relatively stiff but bendable/flexible card. Use of other materials is also contemplated. As such, backer 200 defines a first or front surface 202 (FIG. 9) and a second or rear surface 204 (FIG. 10). Transaction product 10, which is generally represented in phantom lines in FIG. 9 for illustrative purposes (e.g., to allow for full viewing of front surface 202), is readily releasably attached to backer 200, for example, by adhesive, blister packaging, overlying skinning material or the like, such that transaction product 10 with backer 200 collectively define a transaction product assembly 206.

Fold lines 210 and 212 each extend laterally across backer 200 and are spaced longitudinally from one another. A first panel 214, a second or intermediate panel 216 and a third panel 218 are defined by the position of fold lines 210 and 212. First panel 214 extends from fold lines 210 away from fold line 212. Second or intermediate panel 216 extends between fold lines 210 and 212. Third panel 218 extends from fold lines 212 in a direction opposite fold lines 210.

In one embodiment, a tab 220 is generally centered at a first lateral end of backer 200, for example, at an end of first panel 214 opposite fold lines 210. In one example, a support arm aperture 222 is defined within tab 220 and is configured to receive a support arm or hook during display of transaction product assembly 206. In other embodiments, rather than providing multiple fold lines 210, a single fold line 210 is provided. Similarly, in one embodiment, a single fold line 212 is provided as opposed to the multiple fold lines 212 illustrated in FIGS. 9 and 10. In one embodiment, a laterally extending slit 224 is laterally centered on third panel 218.

In one example, during display for sale, backer 200 remains in an unfolded position as illustrated in FIGS. 9 and 10. As such, an open (i.e., unfolded) backer 200 can be hung via aperture 222 on the support arm or hook for display by a retailer in a retail setting. Following purchase, the bearer of transaction product assembly 206 can fold the front surfaces 202 of backer 200 toward each other about fold lines 210 and 212 to wrap backer 200 about transaction product 10. When folded, tab 220 is moved through slit 224 to maintain backer 200 in a folded position for presentation of transaction product 10 by the consumer to a recipient. Other suitable backers will be apparent to those of skill in that art upon reading this application and may or may not be configured to fold or wrap about transaction product 10.

In one embodiment, backer 200 includes a window or opening 230 for displaying account identifier 20 of transaction product 10 through backer 200 as illustrated in FIG. 10. As previously described, account identifier 20 is adapted for accessing an account or record associated with transaction product 10 for activating, loading or debiting value from the account or record. Accordingly, in one embodiment, opening 230 allows access to account identifier 20 to activate and/or load transaction product 10 without removing transaction product 10 from backer 200. In one example, opening 230 is defined on intermediate panel 216 such that account identifier 20 can be accessed therethrough whether backer 200 is folded or unfolded.

In one embodiment, backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front surface 202 and rear surface 204. In one example, the indicia include one or more of redemption indicia 240, message field indicia 242, brand indicia 244, decorative indicia 246, etc.

Redemption indicia 240, which are generally indicated with a dashed line box in FIG. 10, inform a bearer of transaction product assembly 206 that transaction product 10 is redeemable for the purchase of goods and/or services and that upon use, a value of the purchased goods and/or services will be deducted from the financial account or record linked to transaction product 10. In one embodiment, redemption indicia 240 include phrases such as "<NAME OF STORE> Gift-Card" and "This GiftCard is redeemable for merchandise or services at any of our stores or at our website," and/or provides help or phone line information in case of a lost, stolen or damaged transaction product, etc.

Message field indicia 242 (FIG. 9), for example, include "to," "from" and "amount" fields and are configured to be written to by the bearer of transaction product assembly 206 prior to presenting transaction product assembly 206 to a recipient. As such, message field indicia 242 facilitate the consumer in preparing transaction product assembly 206 for gifting to a recipient.

Brand indicia 244 identify a store, brand, department, etc. and/or services associated with transaction product 10. Any decorative indicia 246, which may be similar to or coordinate with indicia of transaction product 10 and/or with the one or more articles 14 maintained in housing 12, may also be included on backer 200. For instance, in one embodiment, decorative indicia 246 include depictions of portions of faces or backs of cards and/or backer 200 may include demarcations simulating stacked edges of the playing cards such that when backer 200 is folded about transaction product 10, backer 200 resembles or at least calls to mind a deck of playing cards. Any of indicia 240, 242, 244, 246 or other indicia optionally may appear anywhere on backer 200 or transaction product 10. Additional information besides that specifically described and illustrated herein may also be included.

Figure 11:
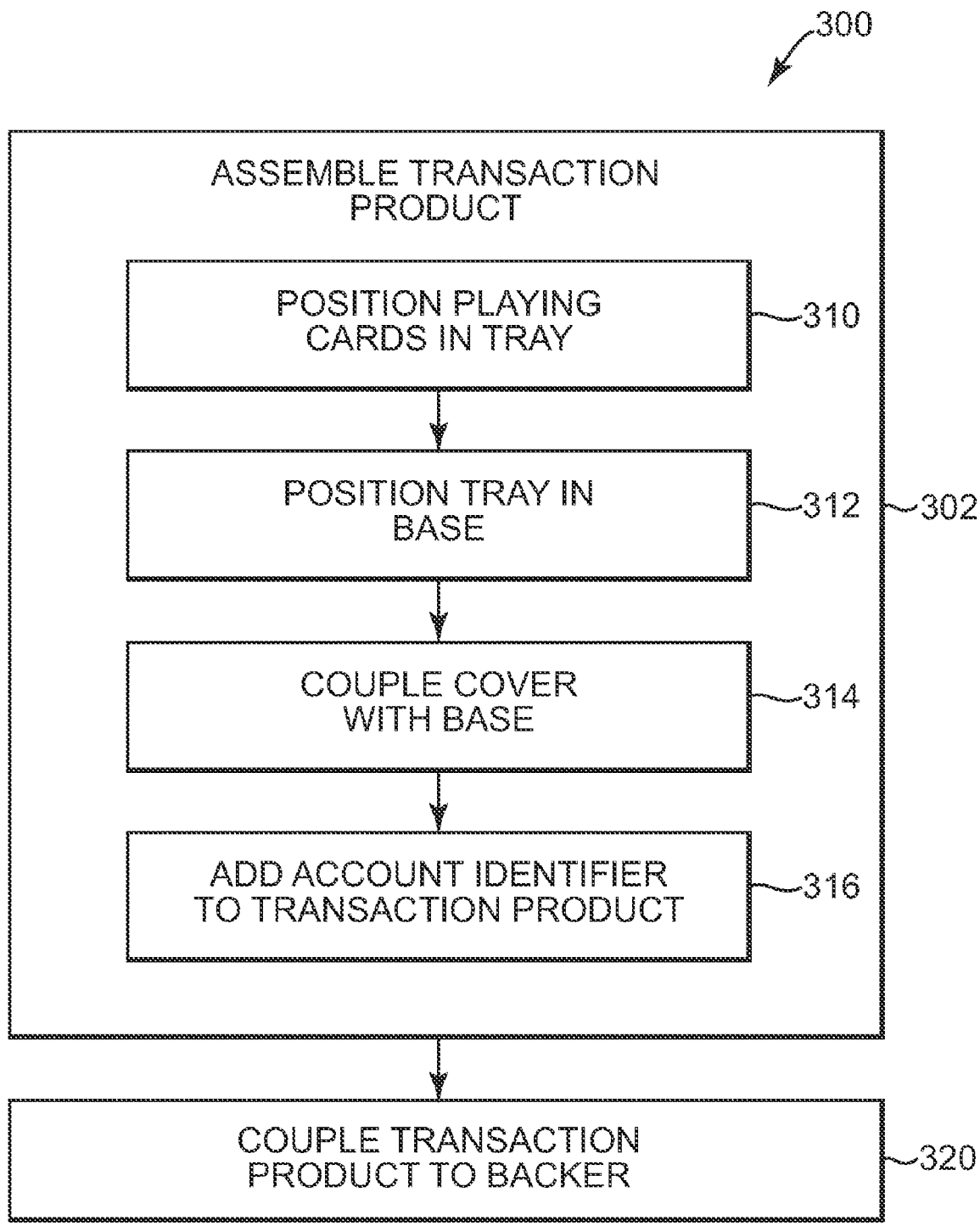
FIG. 11 is a flow chart illustrating a method of assembling a transaction product, according to one embodiment of the present invention.

FIG. 11 is a flow chart illustrating one embodiment of a method 300 of assembling transaction product assembly 206. More specifically, at 302, transaction product 10 is assembled. At 310, the one or more articles 14 are positioned in tray 130. For example, as described above, a portion of the one or more articles 14 (e.g., a stack of some of the playing card articles) is positioned in each of the cavities 132 defined by tray 130. In one embodiment the portion of the one or more articles may be coupled to one another, for example with rubber band 140 or other suitable wrapper prior to placing the portion of the one or more articles 14 in each cavity 132. In one embodiment, tray 130 is eliminated and, therefore, operation 310 may also be eliminated.

At 312, tray 130, where included in transaction product 10, is positioned in storage chamber 48 of base 30. Since tray 130 holds the one or more articles, the one or more articles 14 are also placed in storage chamber 48. In one example, tray 130 is sized to substantially fill storage chamber 48 to prevent or at least decrease shifting of the one or more articles 14 within storage chamber 48. Where tray 130 is eliminated, at 312, the one or more articles 14 may be placed directly into storage chamber 48.

Once the one or more articles 14 are positioned within storage chamber 48, then at 314, cover 32 is coupled with base 30. More specifically, in one example described with reference to FIG. 6 and the cross-sectional view of FIG. 8, cover 32 is slid onto base 30 to effectively cover base 30 thereby enclosing the one or more articles 14 and/or tray 130 therebetween. In particular, open segment 76 of cover 32 is positioned adjacent to an end of base 30. Cover 32 is slid onto base 30, for example, in a direction from right to left as illustrated in FIG. 6 (e.g., slid in a direction substantially perpendicular to an extension of side walls 42 and 62 from the respective primary panels 40 and 60 and/or substantially parallel to the substantially planar extension of primary panel 40 and/or 60). More specifically, cover 32 is slid to interact with base 30 such that rolled edge or flange 52 of base 30 is selectively received within groove 84 of cover 32 defined between lip 82 and primary panel 60 of cover 32. Although primarily described herein as groove 84 of cover 32 receiving flange 52 of base 30, in one example, base 30 defines a groove, which receives lip 82 or other flange defined by cover 32, or any other suitable flange-and-groove coupling may be used as will be apparent to those of skill in the art upon reading the present application.

Cover 32 continues to be slid onto base 30 until a portion of lip 82 of cover 32 contacts a portion of side wall 62 that corresponds with second segment 72 of primary panel 60. In one embodiment, protrusion 118 of cover 32 is sized and positioned such that additional force is applied to cover 32 to move protrusion 118 past/over flange 52 of base 30 in a manner selectively holding or locking cover 32 in a closed position relative to base 30 until a sufficient counter force is applied to cover 32. In one embodiment, a sticker or label 142 is applied to primary panel 60 to more securely maintain cover 32 coupled with base 30 especially during transport and periods displaying transaction product 10 in a retail setting.

At 316, account identifier 20 is added to housing 12, if account identifier is not already part of transaction product 10. Although pictured in FIG. 11 as occurring after all of operations 310, 312 and 314, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 310, 312 and 314 as will be apparent to those of skill in the art upon reading this application.

At 320, transaction product 10 is coupled with backer 200 as generally illustrated with additional reference to FIGS. 9 and 10 to form transaction product assembly 206. Transaction product 10 may be adhered, skinned to, blister packed with or otherwise suitably coupled with backer 200. In one embodiment, account identifier 20 of transaction product 10 is accessible for scanning while transaction product 10 is coupled with backer 200, for example, through opening 230 in backer 200.

Figure 12:
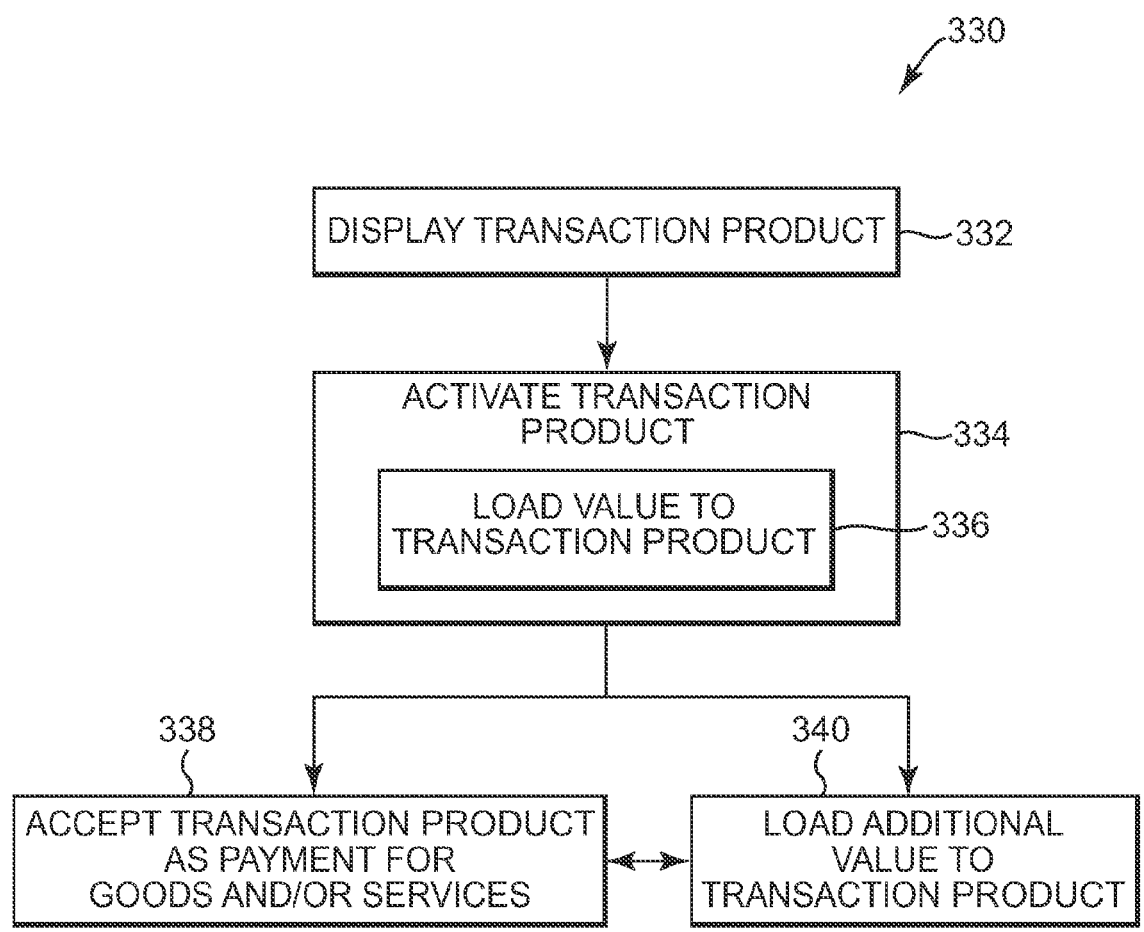
FIG. 12 is a flow chart illustrating a method of encouraging purchase and facilitating use of a transaction product, according to one embodiment of the present invention.

FIG. 12 is a flow chart illustrating one embodiment of a method 330 of encouraging purchase and facilitating use of transaction product 10 by consumers and/or recipients. At 332, transaction product 10 is placed on or hung from a rack, shelf or other similar device to display transaction product 10 for sale to potential consumers. In one embodiment, a depiction of transaction product 10 is placed on a web site for viewing and purchase by potential consumers. In one example, display of transaction product 10 includes advertising the inclusion of one or more articles 14, for example, the inclusion of a deck of playing cards, within transaction product 10 to encourage consumer purchase of transaction product 10, for example, in the form of indicia 240, 242, 244, 246, etc.

At 334, a consumer who has decided to purchase transaction product 10 presents transaction product 10 on backer 200 to a retail store employee, retail store kiosk, remote terminal or other person or device to scan account identifier 20 to access an account or record linked to account identifier 20. In particular, account identifier 20 is scanned or otherwise accessed, for example through opening 230 of backer 200 to activate transaction product 10. Upon accessing the account or record, then, at 336, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 20) prior to activation and display, but such predetermined value is not initially available for use toward the purchase or use of goods and/or services. In such an embodiment, at 334, transaction product 10 is activated to permit subsequent access to the predetermined value (e.g., subsequent loading on and debiting from the account or record) and no additional value is added during activation such that operation 336 may be eliminated.

Once transaction product 10 is activated and loaded, transaction product 10 can be used by the consumer or any other bearer of transaction product 10 to purchase goods and/or services from the retailer at the affiliated retail setting (e.g., a retail store or web site) or can be used in exchange for calling minutes, services, etc. In one embodiment, where transaction product 10 is displayed on a web site at 332, then, at 334, transaction product 10 may be activated in any suitable method and may not require the physical scanning of account identifier 20 to be activated or to otherwise access the associated account or record such as at 336.

In one example, at 338, the retailer accepts transaction product 10 as payment towards the purchase of goods and/or services made by the current bearer of transaction product 10. In particular, the value currently loaded on transaction product 10 (i.e., stored or recorded in the account or record linked to account identifier 20) is applied toward the purchase of goods and/or services. At 340, additional value is optionally loaded on transaction product 10 at a point-of-sale terminal, kiosk or other area of the retail store, retail web site, or other related setting. Upon accepting transaction product 10 as payment at 338, the retail store or related setting can subsequently perform either operation 338 again or operation 340 as requested by a current bearer of transaction product 10. Similarly, upon loading additional value on transaction product 10 at 340, the retail store or related setting can subsequently perform either operation 340 again or operation 338. In one example, the ability to accept transaction product 10 as payment for goods and/or services is limited by whether the account or record associated with transaction product 10 has any value stored or recorded therein at the time of attempted redemption.

Figure 13:
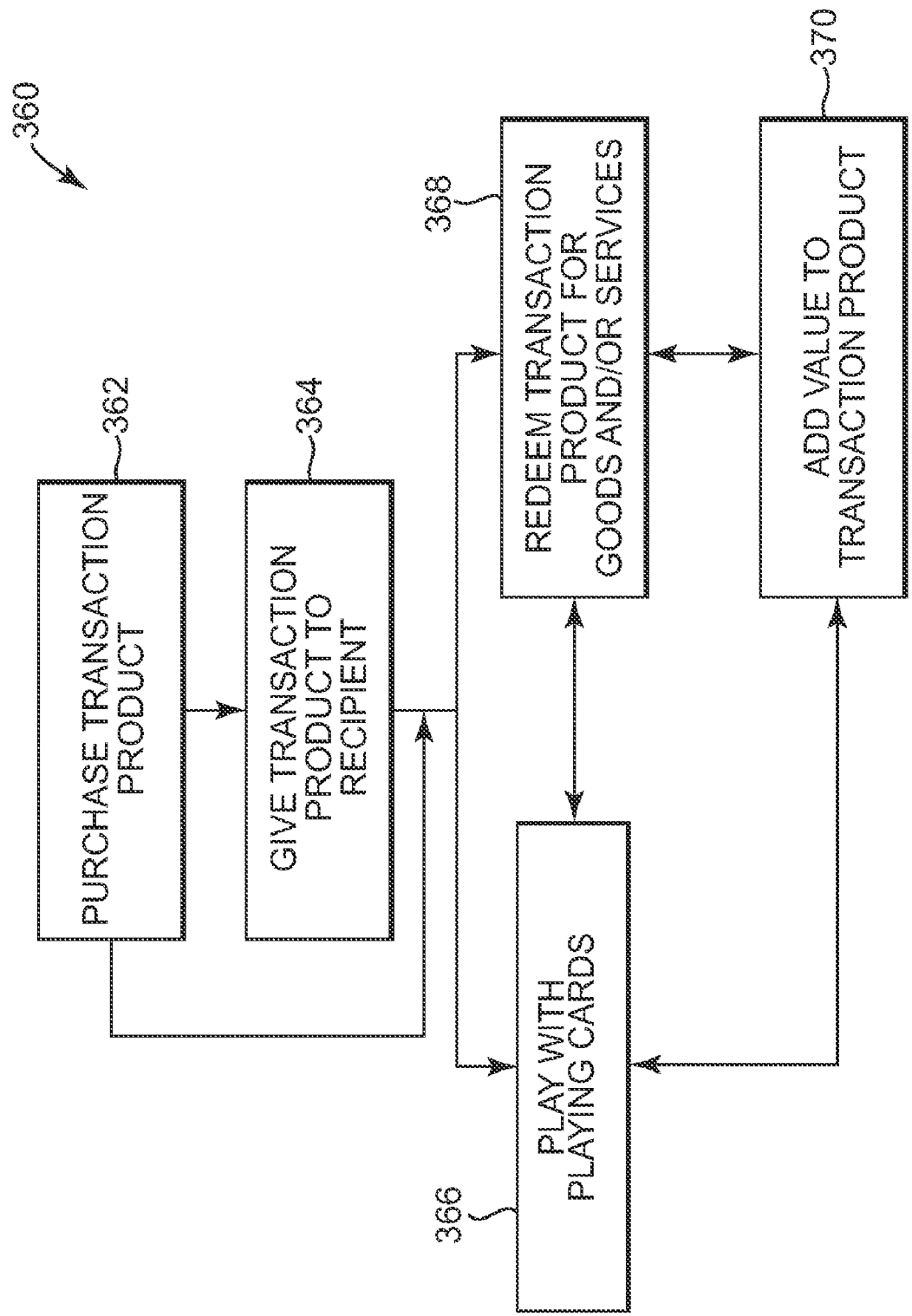
FIG. 13 is a flow chart illustrating a method of using a transaction product, according to one embodiment of the present invention.

FIG. 13 is a flow chart illustrating one embodiment of a method 360 of using transaction product 10 (e.g., FIGS. 1-6). At 362, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 206 (FIG. 10) along with backer 200.

Upon purchasing transaction product 10, a retail store employee, a retail store kiosk or other person or device scans account identifier 20 (FIG. 3), for example, through opening 220 of backer 200 or otherwise reads or accesses account identifier 20. Upon accessing account identifier 20, the account or record linked to account identifier 20 is accessed and activated to load value onto transaction product 10 (i.e., load value to the account or record associated with transaction product 10). In one embodiment, such as where transaction product 10 is purchased at 362 via a web site, actual scanning or other mechanical detection of account identifier 20 may be eliminated and/or manual input of code 22 may be added.

At 364, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 364.

At 366, the consumer, recipient or other current bearer of transaction product 10 interacts with transaction product 10. In one embodiment, playing or otherwise interacting with transaction product 10 at 366 includes uncoupling cover 32 from base 30, for example, by sliding cover 32 off of base 30. Once uncoupled, storage chamber 48 of base 30 and the one or more articles 14 stored therein are accessible. As such, tray 130 with the one or more articles 14 and/or the one or more items alone are removed from storage chamber 48 to allow a bearer to play or otherwise interact with the one or more articles 14. For instance, where the one or more articles 14 include the miniature pack of playing cards, the bearer removes the playing cards to play any suitable card game alone or with others as will be apparent upon reading the present application. Other articles 14 and interaction therewith will also be apparent upon reading the present application.

Following playing with the one or more articles 14 at 366, the one or more articles 14 may be replaced within storage chamber 48 with or without tray 130. Cover 32 is slid back on base 30 to cover storage chamber 48 and to maintain the one or more articles 14 and/or tray 130 therein. In one example, for instance, where the one or more articles 14 are consumables or are stored elsewhere following bearer interaction therewith, housing 12 may be used to store other small items owned by the bearer of transaction product 10 as will be apparent to one of skill in the art upon reading this application.

At 368, the consumer or recipient redeems transaction product 10 for goods and/or services, fore example, from the retail store or web site. At 370, the consumer or recipient of transaction product 10 optionally adds value to transaction product 10, more particularly, to the account or record associated with account identifier 20 included therewith, at the retail store or over the Internet (i.e., via the web site). Upon playing with transaction product 10 at 366, redeeming transaction product 10 at 368 or adding value to transaction product 10 at 370, the consumer or recipient of transaction product 10 subsequently can perform either of operations 366, 368 or 370 as desired. In one example, operation 366 and one or more of operations 368 and 370 can be performed substantially simultaneously wherein only article(s) 14 are used at 366 and wherein only housing 12 without article(s) 14 is used at 368 and/or 370. In one embodiment, the ability of the consumer or recipient to repeat redeeming transaction product 10 at 370 is limited by whether the account or record linked with transaction product 10 has any remaining value stored or recorded therein at the time of attempted redemption.

Although primarily described above as occurring at a single retail store or web site, in one embodiment, purchasing transaction product 10 at 362, redeeming transaction product 10 at 368 and adding value to transaction product 10 at 370, can each be performed at any one of a number of stores adapted to accept transaction product 10 or over the Internet. In one example, each of the number of stores is part of a chain or a group of similarly branded stores. In one example, a number of stores include at least one web site and/or at least one conventional brick and mortar store.

Figure 14:
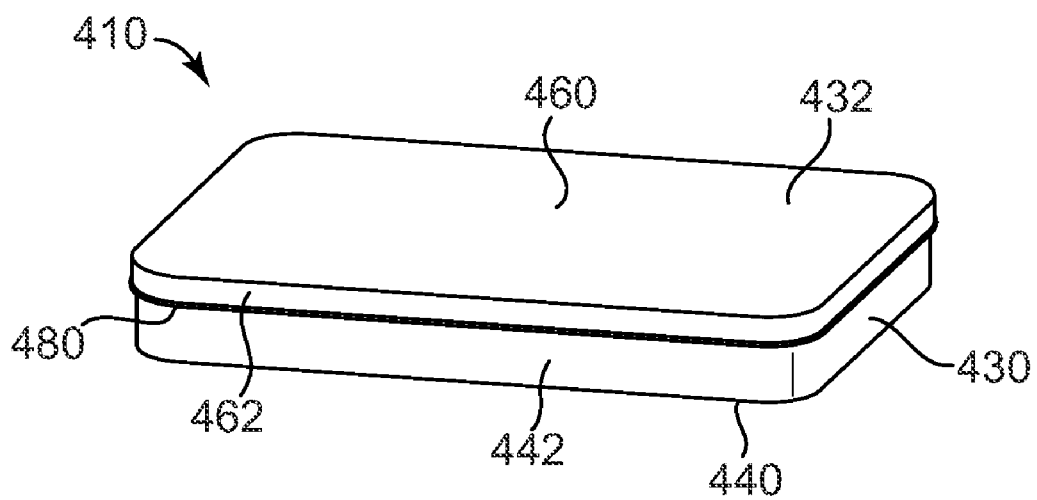
FIG. 14 is a perspective view illustration of a transaction product in a first position, according to one embodiment of the present invention.
Figure 15:
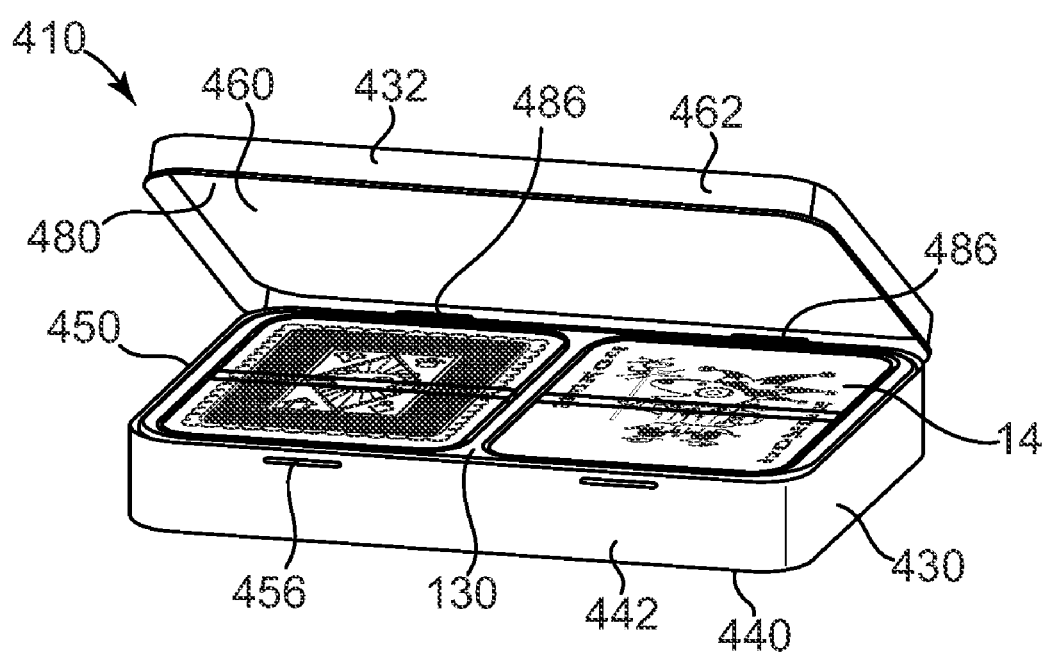
FIG. 15 is a perspective view illustration of the transaction product of FIG. 14 in a second position, according to one embodiment of the present invention.

FIGS. 14 and 15 illustrate one embodiment of a transaction product 410 according to one embodiment of the present invention. Transaction product 410 is substantially similar to transaction product 10 (FIGS. 1-6) as described above except where specifically enumerated herein. Transaction product 410 includes a housing 412, one or more articles 14 and, in one embodiment, tray 130 selectively stored within housing 412. Housing 412 includes a base 430 and a cover 432 coupled to one another in a manner providing selective access to the one or more articles 14 stored therein. Base 430 and cover 432 are formed of any suitable materials such as the materials described above with respect to base 30 and cover 32.

More specifically, base 430 includes a primary panel 440 and a side wall 442 similar to primary panel 40 and side wall 42 as described above such that the one or more articles 14 are able to be collectively maintained between primary panel 440 and side wall 442. Cover 432 includes a primary panel 460 sized similarly to but, in one embodiment, slightly larger than primary panel 440 of base 430. Although illustrated as being substantially opaque, in one embodiment, cover 432 may include a window or other transparent or translucent member similar to cover 32. A side wall 462 extends around a perimeter of primary panel 460 with a substantially perpendicular orientation relative to primary panel 460 to define an edge 464 opposite primary panel 460. In one embodiment, side wall 462 is shorter than side wall 442.

Cover 432 is configured to be selectively moved to close housing 12 by covering edge 450 of base 430 and extending over the one or more articles 14 maintained therein. When closed, an inside surface 480 of primary panel 460 contacts edge 450 of base 430 and side wall 462 of cover 432 extends around a least a portion of side wall 442 of base 430. In one example, cover 432 is permanently coupled with base in a manner allowing cover 432 to move (e.g., to rotate) between a closed position as illustrated in FIG. 14 to an open position as illustrated in FIG. 15. For instance, in one embodiment, cover 432 is rotatably coupled with cover 432 with one or more hinges 486. In one example, hinges 486 are collectively defined in part by each of base 430 and cover 432 and/or are formed separately from and coupled with each of base 430 and cover 432.

In one embodiment, base 430 includes protrusions, indentations or other locking features 456 along a segment of side wall 442 opposite hinges 486. Locking features 456 are configured to interact with cover 432 to provide a friction lock, which will hold cover 432 in the closed position until a sufficient counter force is applied thereto to move cover 432 to an open position as will be apparent to those of skill in the art upon reading the present application.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the value or balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction product, comprising:
  a housing including:
    a first member defining a primary panel and a side wall extending around the primary panel to define a storage chamber, and
    a second member slidably coupled with the first member, wherein the second member is configured to slide relative to the first member between an open position and a closed position, wherein in the closed position, the second member covers the storage chamber, and in the open position, the storage chamber is readily accessible, and wherein the second member slides relative to the first member in a direction substantially perpendicular to an extension of the side wall from the primary panel of the first member, wherein the first member and the second member each define an outside surface;
  one or more articles maintained within the storage chamber of the housing, wherein the one or more articles includes a deck of miniature playing cards; and
  an account identifier secured to the outside surface of one of the first member and the second member and linking the housing to an account or a record, wherein the account identifier is machine readable.

2. The transaction product of claim 1, wherein the account identifier is a bar code printed to the outside surface of the one of the first member and the second member of the housing.

3. The transaction product of claim 2, wherein the first member is formed of a single piece of material, and the bar code is printed to the outside surface of the first member.

4. The transaction product of claim 3, further comprising:
  a tray removably maintained within the storage chamber and defining two separate cavities,
  wherein:
    the deck of miniature playing cards is arranged in two separate stacks of miniature playing cards,
    each one of the two separate stacks of miniature playing cards is removably maintained within a different one of the two separate cavities of the tray, and
    the second member includes a frame portion, which is formed of a first material that is opaque and defines a central opening, and a window, which is formed of a second material that is one of transparent and translucent and covers the opening, such that each of the two separate stacks of miniature playing cards is at least partially viewable through the window.

5. The transaction product of claim 1, wherein the account identifier includes at least one of a bar code, a magnetic strip, a smart chip and a radio frequency identification (RFID) device.

6. The transaction product of claim 1, wherein the first member and the second member slidably interact with one another via a flange-and-groove coupling.

7. The transaction product of claim 1, wherein the housing is substantially rectangular, one of the first member and the second member defines a groove on two sides of the housing that are substantially parallel with one another, and the other of the first member and the second member defines a flange; wherein the groove is configured to slidably receive the flange.

8. The transaction product of claim 1, wherein the side wall defines an edge opposite the primary panel, the first member includes a flange extending radially outwardly from the edge of the side wall, and the second member defines a groove sized and positioned to slidably receive the flange of the first member.

9. The transaction product of claim 8, wherein the primary panel of the first member is a first primary panel, the second member defines a second primary panel and a lip spaced from the second primary panel such that the groove is defined between the second primary panel and the lip of the second member.

10. The transaction product of claim 9, wherein the second primary panel is substantially rectangular in shape and defines four sides, the second member defines a second side wall that substantially surrounds only three of the four sides of the second primary panel, and the second side wall defines the lip.

11. The transaction product of claim 1, further comprising a tray removably maintained within the storage chamber, wherein the tray removably maintains the one or more articles.

12. The transaction product of claim 1, wherein the housing is at least partially formed of a metal material.

13. The transaction product of claim 12, wherein the metal material is one of tin, steel and aluminum.

14. The transaction product of claim 1, wherein the first member and the second member collectively and entirely form the housing.

15. The transaction product of claim 1, further comprising a backer formed separately from and supporting the housing, wherein the backer is configured to be hung from a support structure in a manner hanging the housing via the backer.

16. The transaction product of claim 1, in combination with a database separate from the transaction product and storing the account or record linked to the housing via the account identifier, wherein the account or record tracks a financial value available for application toward future purchases one or more of goods and services.

17. A transaction product, comprising:
a housing including:
a first member defining a primary panel and a side wall extending around the primary panel to define a storage chamber, and
a second member slidably coupled with the first member, wherein the second member is configured to slide relative to the first member between an open position and a closed position, wherein in the closed position, the second member covers the storage chamber, and in the open position, the storage chamber is readily accessible, and wherein the second member slides relative to the first member in a direction substantially perpendicular to an extension of the side wall from the primary panel of the first member;
a tray removably maintained within the storage chamber and defining two separate cavities, and
an account identifier linking the housing to an account or a record, wherein the account identifier is machine readable;
wherein the second member is formed of a first material that is opaque and a second material that is one of transparent and translucent, and the first material is coupled with the second material to form a window for viewing the storage chamber through the second member.

18. A stored-value product comprising:
a miniature deck of playing cards;
means for removably containing the miniature deck of playing cards; and
means for linking the means for removably containing the miniature deck of playing cards with at least one of an account and a record having a value associated therewith such that the stored-value product can be used as payment toward a purchase of one or more of goods and services;
wherein
the means for removably containing defines a chamber for receiving the miniature deck of playing cards and includes a substantially planar primary panel defining an interior surface and an exterior surface opposite the interior surface,
the substantially planar primary panel is formed of a single piece of material,
the interior surface directly abuts the chamber,
the means for linking is statically coupled directly to the exterior surface of the substantially planar primary panel such that the means for linking is exposed to an external atmosphere surrounding the stored-value product permitting direct access to the means for linking during processing of the stored-value product.

19. The stored-value product of claim 18, further comprising means for organizing the miniature deck of playing cards within the means for removably containing the miniature deck of playing cards.

20. The stored-value product of claim 19, wherein the means for removably containing the miniature deck of playing cards includes a base configured to receive the miniature deck of playing cards and a cover slidably coupled with the base to enclose the miniature deck of playing cards between the base and the cover, and the base includes the substantially planar primary panel.

21. The stored-value product of claim 18, wherein the miniature deck of playing cards includes means for advertising a retailer adapted to accept the stored-value product as payment toward the purchase of one or more of goods and services.

22. The stored-value product of claim 18, wherein the means for linking is securely connected to an outside surface of the means for removably containing.

23. A method of encouraging purchase and facilitating use of a stored-value card linked to a record or account, the method comprising:
providing the stored-value card, wherein the stored-value card includes a first member defining a storage chamber and a second member selectively coupled with the first member to enclose the storage chamber therebetween, wherein:
the first member and the second member are each at least partially formed of a metallic material,
the first member is formed as a single piece of material and defines an external surface opposite the storage chamber,
an account identifier is printed to the external surface of the first member and links the stored-value card to the record or account, and
the stored-value card includes one or more items selectively maintained within the storage chamber;
the one or more items includes a deck of miniature playing cards;
displaying the stored-value card to a potential consumer; and activating the record or account linked to the stored-value card to permit subsequent deductions from a value associated with the record or account for application toward one of a purchase and a use of one or more of goods and services, wherein activating occurs by reading the account identifier while the first and second member are coupled with one another to enclose the storage chamber therebetween and while the one or more items are maintained within the storage chamber.

24. The method of claim 23, wherein displaying the stored-value card to the potential consumer includes promoting that one or more items are maintained within the storage chamber, and the one or more items are configured to provide one or more of amusement and functionality to the potential consumer.

25. The method of claim 23, wherein providing the stored-value card includes providing the stored-value card such that the first member and the second member are selectively coupled with one another by one or more hinges.

26. The method of claim 23, wherein providing the stored-value card includes providing the stored-value card such that the first member and the second member are selectively coupled with one another such that the first member slides relative to the second member between an open position and a closed position.

27. The method of claim 23, wherein:
the record or account is stored on a database separate from the stored-value card and accessible via a point-of-sale terminal, and
activating the record or account includes using the point-of-sale terminal to read the account identifier of the stored-value card while the second member remains coupled with the first member enclosing the storage chamber therebetween.

28. A method of assembling a transaction card, the method comprising:
providing a frame member, which defines a side wall and an aperture;
providing a substantially planar member, which is formed from a different material than the frame member, the substantially planar member being one of translucent and transparent;
coupling the substantially planar member to the frame member to collectively define a cover, wherein the substantially planar member extends across the aperture of the frame member;
coupling the cover to a base, which defines a compartment therein, to enclose the compartment between the cover and the base, wherein the compartment is visible through the substantially planar member of the cover;
providing a removable tray within the compartment, the removable tray defining two separate cavities, and
applying an account identifier to the transaction card, wherein the account identifier links the transaction card to an account or record, wherein each of the frame member, the substantially planar member, and the base is formed as a single piece of material separate from other ones of the frame, the substantially planar member, and the base.

29. The method of claim 28, wherein coupling the cover to the base includes coupling the cover to the base such that the cover is one of slidable and rotatable relative to the base, and applying an account identifier to the transaction card includes rigidly coupling the account identifier to an outermost surface of the base such that the account identifier is exposed to surroundings of the transaction product.

* * * * *